United States Patent
Mittal et al.

(10) Patent No.: US 12,212,488 B2
(45) Date of Patent: *Jan. 28, 2025

(54) DISCOVERING A REVERSE PATH FOR INITIATING BIDIRECTIONAL FORWARDING DETECTION (BFD)

(71) Applicant: Ciena Corporation, Hanover, MD (US)

(72) Inventors: Aditya Mittal, Gurgaon (IN); Pankaj Verma, Kanpur (IN); Sudipta Das, New Delhi (IN)

(73) Assignee: Ciena Corporation, Hanover, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/439,261

(22) Filed: Feb. 12, 2024

(65) Prior Publication Data

US 2024/0187338 A1    Jun. 6, 2024

Related U.S. Application Data

(63) Continuation of application No. 17/559,941, filed on Dec. 22, 2021, now Pat. No. 11,936,557.

(30) Foreign Application Priority Data

Nov. 9, 2021 (IN) .............................. 202111051295

(51) Int. Cl.
*H04L 45/00* (2022.01)
*H04L 45/50* (2022.01)

(52) U.S. Cl.
CPC .............. *H04L 45/26* (2013.01); *H04L 45/34* (2013.01); *H04L 45/50* (2013.01)

(58) Field of Classification Search
None
See application file for complete search history.

(56) References Cited

U.S. PATENT DOCUMENTS

| | | | |
|---|---|---|---|
| 9,497,107 B1* | 11/2016 | Akiya | H04L 43/10 |
| 11,936,557 B2* | 3/2024 | Mittal | H04L 45/34 |
| 2007/0162614 A1* | 7/2007 | Patel | H04L 45/28 |
| | | | 709/239 |
| 2008/0080507 A1 | 4/2008 | Swallow et al. | |
| 2017/0099180 A1 | 4/2017 | Singh et al. | |
| 2018/0212828 A1 | 7/2018 | Sekhri et al. | |
| 2019/0222500 A1 | 7/2019 | Nainar et al. | |
| 2020/0127909 A1 | 4/2020 | Mittal et al. | |
| 2021/0058989 A1 | 2/2021 | Simsek et al. | |

(Continued)

*Primary Examiner* — Xavier S Wong
(74) *Attorney, Agent, or Firm* — Baratta Law PLLC; Lawrence A. Baratta, Jr.

(57) ABSTRACT

Systems and methods at a reflector node include steps of receiving a request from an initiator node in the network, the request having been sent in a forward direction from the initiator node to the reflector node to discover a reverse path in a reverse direction from the reflector node to the initiator node, and transmitting a reply to the initiator node with one or more reverse Segment Routing (SR) policies that meet one or more path constraint parameters in the request. The reply can include associated Segment Identifiers (SIDs) for the one or more reverse SR policies. The steps can further include implementing one of Bidirectional Forwarding Detection (BFD) or a Multi-Protocol Label Switching (MPLS) Ping procedure with the initiator node, sent over one of the one or more reverse SR policies.

20 Claims, 6 Drawing Sheets

(56) References Cited

U.S. PATENT DOCUMENTS

2021/0250284 A1    8/2021  Aggarwal et al.
2023/0261977 A1*   8/2023  Fan ...................... H04L 45/033
                                                  370/235

* cited by examiner

| 0 0 0 0 0 0 0 0 0 0 1 1 1 1 1 1 1 1 1 1 2 2 2 2 2 2 2 2 2 2 3 3 |
| 0 1 2 3 4 5 6 7 8 9 0 1 2 3 4 5 6 7 8 9 0 1 2 3 4 5 6 7 8 9 0 1 |

| TLV: type | TLV: length |
|---|---|
| TLV: value (count) | |
| Path Constraint Flags | |
| Path Constraint: color | |
| Path Constraint: path type | |
| Path Constraint: origin | |
| Target FEC Stack Sub-TLV | |
| ... | |
| Target FEC Stack Sub-TLV | |

| 0 0 0 0 0 0 0 0 0 0 1 1 1 1 1 1 1 1 1 1 2 2 2 2 2 2 2 2 2 2 3 3 |
| 0 1 2 3 4 5 6 7 8 9 0 1 2 3 4 5 6 7 8 9 0 1 2 3 4 5 6 7 8 9 0 1 |

| MBZ (or for future use) | O | T | C |
|---|---|---|---|

DISCOVERING A REVERSE PATH FOR INITIATING BIDIRECTIONAL FORWARDING DETECTION (BFD)

CROSS-REFERENCE

The present disclosure is a continuation of U.S. patent application Ser. No. 17/559,941, filed Dec. 22, 2021, the contents of which are incorporated by reference in their entirety.

TECHNICAL FIELD

The present disclosure generally relates to networking systems and methods. More particularly, the present disclosure relates to performing a reverse path discovery procedure for the purpose of initiating Bidirectional Forwarding Detection (BFD) while using the discovered reverse path.

BACKGROUND

Generally, a centralized controller may be used to control or manage one or more nodes in an administration domain of a communications network. Normally, one particular centralized controller will be used only for control and management over the nodes within its respective administration domain and usually will be unrelated to (or have no control over) the nodes outside its admin domain. Also, some admin domains may have multiple controllers for controlling different sections of the admin domain and/or may include gaps where there is no centralized control. In this respect, two nodes communicating with each in a network may not share the same centralized controller that could coordinate control aspects in a control plane of the network to more easily organize communications between the pair of nodes. Therefore, since it is common that there may be gaps in the control of different nodes, certain communication protocols may rely on other ways of coordinating two remote nodes, such as requiring manual operations by a network administrator which may require an explicit knowledge of the remote nodes.

For example, with respect to the recently-created Segment Routing (SR) standards, the mechanisms that exist today to find reverse SR policies are either manual or they require a centralized Software-Defined Networking (SDN) controller. As mentioned above, having a centralized controller is not a guarantee, which would then require that manual processes be performed to discover reverse SR policies, which can be tedious for the user (e.g., network administrator). Therefore, there is a need in the field of communications networks (and particularly in sections of networks where SR may be implemented) to discover a suitable reverse path from a remote node back to an initiating node. By performing this reverse path discovery, it may be possible, as described in the various embodiments of the present disclosure, to subsequently perform a more efficient Bidirectional Forwarding Detection (BFD) procedure.

BRIEF SUMMARY

The present disclosure is directed to a system having multiple nodes operating in a network, where two nodes (equipped with the functionality described in the present disclosure) are configured to perform a four-stage procedure without any centralized control. The four-stage procedure involves sending a ping request from an initiator node to a reflector node and then sending a ping reply from the reflector node back to the initiator node with information useful for determining a reverse path to be used in subsequent stages. The four-stage procedure also involves sending a Bidirectional Forwarding Detection (BFD) request from the initiator node to the reflector node along a first selected path and then sending a BFD reply from the reflector node back to the initiator node along a reverse path selected by the initiator node. Embodiments of the present disclosure may be focused on the perspective of the initiator node, which is responsible for the first and third stages of the four-stage procedure, may be focused on the perspective of the reflector node, which is responsible for the second and fourth stages of the four-stage procedure, and/or may be focused on any suitable perspective within a network in which the two nodes operate.

As an example, an initiator node operating in a network is described in the present disclosure. The initiator node, according to some implementations, may include a processing device and a memory device configured to store a computer program. The computer program may have instructions that, when executed, enable the processing device to send an echo request in a forward direction to a reflector node operating in the network. For instance, the network may not include any centralized controller that manages both the initiator node and the reflector node. The echo request may be sent to the reflector node to discover a reverse path in a reverse direction from the reflector node to the initiator node. Also, the reverse path may be discovered for the purpose of initiating a BFD procedure. According to some embodiments, the echo request, for example, may be a Multi-Protocol Label Switching (MPLS) ping message on a non-policy Segment Routing (SR) tunnel.

Furthermore, the echo request may include an appeal to obtain information about one or more SR policies in the reverse direction. For example, each of the SR policies may include a label stack that defines one or more intermediate nodes in an SR path from the reflector node to the initiator node. Also, this information may include a count (N), constraint flags, and path constraint parameters, where the count N may represent a maximum number of SR policies in the reverse direction to be obtained. Each of the constraint flags may indicate whether a respective path constraint parameter is to be obtained. Each of the path constraint parameters may include color, type, and origin, where color may be a numeric value that distinguishes an SR policy from other SR policies, where type may be a numeric value that represents a path type of each SR policy in the reverse direction, and where origin may be a numeric value that represents an originator of each SR policy in the reverse direction. In some embodiments, the path constraint parameters may be user-defined constraints.

In addition, the instructions may further enable the processing device to receive an echo reply from the reflector node in response to the echo request, where the echo reply may include a number (M) of reverse Segment Routing (SR) policies that meet one or more path constraint parameters. Each of the M reverse SR policies may include a label stack and a Binding Segment Identifier (BSID). The instructions may further enable the processing device to receive a user selection for selecting one of the reverse SR policies. In some embodiments, the instructions may further enable the processing device to initiate a Seamless BFD (S-BFD) procedure by transmitting an S-BFD request including the BSID of the selected reverse SR policy to the reflector node along a selected forward SR policy. In response to receiving the S-BFD request, the reflector node may be configured to cache the BSID, process a payload of the S-BFD request, and expand the BSID to include a list of one or more reverse Segment Identifiers (SIDs) for transmission of an S-BFD reply to the initiator node along the selected reverse SR policy.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Figure 1:
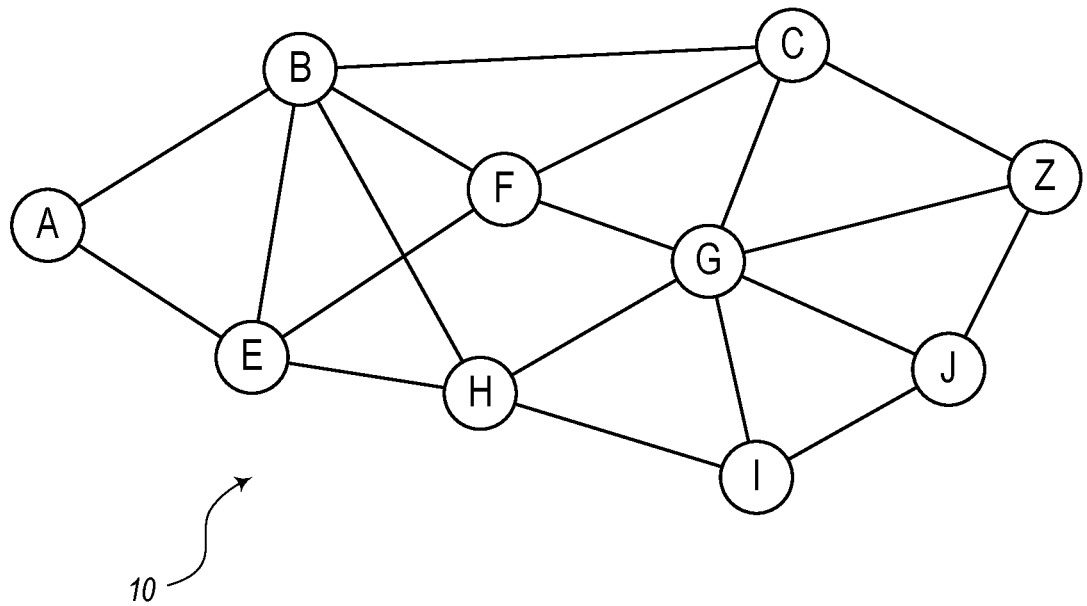
FIG. 1 is a diagram illustrating a communications network having a number of nodes, according to various embodiments.

The present disclosure relates to systems and methods for performing a discovery of a reverse-labeled reply path from a remote node back to a source node. The reverse path discovery may include a procedure involving an echo request and an echo reply. The echo procedure may include Multi-Protocol Label Switching (MPLS) ping operations to discover multiple reverse Segment Routing (SR) paths (e.g., SR policies). By discovering these paths and selecting a suitable one, it may then be possible to perform a Bidirectional Forwarding Detection (BFD) procedure (e.g., as defined at least in RFC 5880) more efficiently. In some embodiments, a Seamless BFD (S-BFD) procedure (e.g., as defined at least in RFC 7880) may be performed subsequent to discovering and selecting the reverse path.

The present disclosure provides solutions to perform a dynamic search for finding reverse SR policies, which may be based on user provided constraints. This search can be initiated at an initiator node itself and can leverage an MPLS ping mechanism over a "plain non-policy SR tunnel" and use new "reverse path info" (described below), in the form of Type-Length-Value (TLV) data. MPLS echo request/reply operations may be used to determine the reverse SR policies from Node Z to A when triggered on an initiator node (Node A). A user at the initiator node may be allowed to choose to add constraints for the search of reverse Sr policies. The constraints may help to select reverse SR policies matching the various criteria, and may one or more of color, path-type, path-origin, etc.

Segment Routing (SR)

Segment Routing (SR) is a technology that implements a source routing paradigm. A packet header includes a stack of function identifiers, known as segments, which define an ordered list of functions to be applied to the packet. A segment can represent any instruction (e.g., topological or service-based). A segment can have a local semantic to an SR node or global within an SR domain. These functions include, but are not limited to, the forwarding behaviors to apply successively to the packet, notably destination-based unicast forwarding via a sequence of explicitly enumerated nodes (domain-unique node segments) and links (adjacency segments), and the like. SR allows forcing a flow through any topological path and service chain while maintaining a per-flow state only at the ingress node to the SR domain. SR is described, e.g., in Fiflsfils et al., RFC 8402, "Segment Routing Architecture," Internet Engineering Task Force (IETF), July 2018, the contents of which are incorporated herein by reference. A particular attraction of SR is that it obviates the need to install and maintain any end-to-end (e2e) path state in the core network. Only the ingress node for a particular flow needs to hold the segment stack, which is applied as the header of every packet of that flow, to define its route through the network. This makes SR particularly suited to control by a Software-Defined Networking (SDN) model.

SR can be directly applied to MPLS with no change in the forwarding plane. A segment is encoded as an MPLS label. An ordered list of segments is encoded as a stack of labels. The segment to process is on the top of the stack. Upon completion of a segment, the related label is popped from the stack. SR can also be applied to the Internet Protocol (IP) (e.g., v6) architecture with a new type of routing extension header, such as, for example, according to the document published in July 2015 as draft-previdi-6man-segment-routing-header (available online at "tools.ietforg/html/draft-previdi-6man-segment-routing-header-08"). A segment is encoded as an IPV6 address. An ordered list of segments is encoded as an ordered list of IPV6 addresses in the routing extension header. The segment to process at any point along the path through the network is indicated by a pointer in the routing extension header. Upon completion of a segment, the pointer is incremented. SR can also be applied to Ethernet (e.g., IEEE 802.1 and variants thereof). There are numerous benefits asserted for SR, including, for example, scalable end-to-end policy, easy incorporation in IP and SDN architectures, operational simplicity, a balance between distributed intelligence, centralized optimization, and application-based policy creation, and the like.

In loose source routing such as SR, a source node chooses a path and encodes the chosen path in a packet header as an ordered list of segments. The rest of the network executes the encoded instructions without any further per-flow state. SR provides full control over the path without the dependency on network state or signaling to set up a path. This makes SR scalable and straight-forward to deploy. SR natively supports both IPV6 (SRv6) and MPLS (SR-MPLS) forwarding planes and can co-exist with other transport technologies (e.g., Resource Reservation Protocol (RSVP)-Traffic Engineering (RSVP-TE), Label Distribution Protocol (LDP), and the like).

In SR, a path includes segments which are instructions a node executes on an incoming packet. For example, segments can include forward the packet according to the shortest path to the destination, forward through a specific interface, or deliver the packet to a given application/service instance). Each segment is represented by a Segment Identifier (SID). All SIDs are allocated from a Segment Routing Global Block (SRGB) with domain-wide scope and significance, or from a Segment Routing Local Block (SRLB) with local scope. The SRGB includes the set of global segments in the SR domain. If a node participates in multiple SR domains, there is one SRGB for each SR domain. In SRv6, the SRGB is the set of global SRv6 SIDs in the SR domain.

A segment routed path is encoded into the packet by building a SID stack that is added to the packet. These SIDs are popped by processing nodes, and the next SID is used to decide forwarding decisions. A SID can be one of the following types: an adjacency SID, a prefix SID, a node SID, a Binding SID (BSID), and an any-cast SID. Each SID represents an associated segment, e.g., an adjacency segment, a prefix segment, a node segment, a binding segment, and an any-cast segment.

An adjacency segment is a single-hop (i.e., a specific link). A prefix segment is a multi-hop tunnel that can use equal-cost multi-hop aware shortest path links to reach a prefix. A prefix SID can be associated with an IP prefix. The prefix SID can be manually configured from the SRGB and can be distributed by Intermediate System to Intermediate System (IS-IS), Open Shortest-Path First (OSPF), etc. The prefix segment steers the traffic along the shortest path to its destination. A node SID is a special type of prefix SID that identifies a specific node. It is configured under the loopback interface with the loopback address of the node as the prefix. A prefix segment is a global segment, so a prefix SID is globally unique within the segment routing domain. An adjacency segment is identified by a label called an adjacency SID, which represents a specific adjacency, such as egress interface, to a neighboring router. The adjacency SID is distributed by IS-IS or OSPF. The adjacency segment steers the traffic to a specific adjacency.

A binding segment represents an SR policy. A head-end node of the SR policy binds a Binding SID (BSID) to its policy. When the head-end node receives a packet with an active segment matching the BSID of a local SR Policy, the head-end node steers the packet into the associated SR Policy. The BSID provides greater scalability, network opacity, and service independence. Instantiation of the SR Policy may involve a list of SIDs. Any packets received with an active segment equal to BSID are steered onto the bound SR Policy. The use of a BSID allows the instantiation of the policy (the SID list) to be stored only on the node or nodes that need to impose the policy. The direction of traffic to a node supporting the policy then only requires the imposition of the BSID. If the policy changes, this also means that only the nodes imposing the policy need to be updated. Users of the policy are not impacted. The BSID can be allocated from the local or global domain. It is of special significance at the head-end node where the policy is programmed in forwarding.

SR Traffic Engineering (SR-TE) provides a mechanism that allows a flow to be restricted to a specific topological path, while maintaining per-flow state only at the ingress node(s) to the SR-TE path. It uses the Constrained Shortest Path First (CSPF) algorithm to compute paths subject to one or more constraint(s) (e.g., link affinity) and an optimization criterion (e.g., link latency). An SR-TE path can be computed by a head-end of the path whenever possible (e.g., when paths are confined to single IGP area/level) or at a Path Computation Element (PCE) (e.g., when paths span across multiple IGP areas/levels). Since SR is unidirectional, transmission from a first node to a second node may take one path while transmission in the reverse direction may take another path.

The SR path (or SR policy) includes a set segment lists that may be explicitly or statically configured. If an SR path becomes active, then traffic matching the SR policy is load-balanced across the segment lists of the path in an equal, unequal, or weighted distribution. Each path is associated with a BSID, which is a SID value that represents a SR policy (or more specifically, its selected path) to upstream routers. BSIDs provide isolation or decoupling between different source-routed domains and improve overall network scalability. Usually, all candidate paths of a SR policy are assigned the same BSID. The BSID may be associated with a static policy in the form of an MPLS label (e.g., in the range from 32 to 1048575). The BSID is a label that is available in the reserved-label-block associated with SR policies and enables an SR policy to be activated.

In some cases, an SR policy (i.e., SR path) may be identified by a tuple (e.g., head-end router, color, and end point). A SR policy may be selected from one or more candidate paths and installed in a data plane. Certain properties of the SR policy may come from the selected path (e.g., BSID, segment list, etc.). The "head-end" is the network element (e.g., node, router, switch, etc.) where the SR Policy is initiated. The "color" is a numerical value that is used to differentiate an SR policy from the multiple SR policy candidates between a particular pair of network elements. The color determines the set of traffic flows steered by the SR policy. The "end-point" is the remote network element that represents the destination of the SR policy.

Bidirectional Forwarding Detection (BFD)

Bidirectional Forwarding Detection (BFD) is a network protocol that is used to detect faults between two routers or switches connected by a link. BFD provides low-overhead detection of faults even on physical media that do not support other types of failure detection. BFD includes establishing a session between two endpoints over a particular link. If more than one link exists between them, multiple BFD sessions may be established.

BFD normally does not have a discovery mechanism associated with it. However, according to the various embodiments of the present disclosure, an SR discovery process may proceed BFD, as described herein. BFD may be used on different underlying transport mechanisms and layers or may operate independently of them. Therefore, BFD may be encapsulated within whatever transport mechanism it uses. For example, the process of monitoring MPLS Label Switched Paths (LSPs) may involve establishing a piggybacking session on LSP ping packets. Protocols that support some form of adjacency setup (e.g., OSPF, IS-IS, BGP, RIP, etc.) may also be used to bootstrap a BFD session. These protocols may then use BFD to receive faster notification of failing links than would normally be possible using the protocol's own keep-alive mechanism.

Seamless BFD (S-BFD)

Seamless Bidirectional Forwarding Detection (S-BFD) is a simplified mechanism for using BFD with a substantial proportion of negotiation aspects eliminated. S-BFD provides benefits such as quick provisioning, improved control, and flexibility for network nodes initiating path monitoring. S-BFD provides improvements to BFD that can be used to better fit existing technologies, to further improve efficiency, and expand failure detection coverage, which can enable BFD on a wider scale.

S-BFD may use core BFD technologies to leverage existing implementations and protocol machinery, while providing a simplified and largely stateless infrastructure for continuity testing. One key aspect of the S-BFD mechanism is that it eliminates the time between a network node wanting to perform a continuity test and the network node actually completing the continuity test. In traditional BFD, the initial state would need to change from DOWN to UP, whereby in S-BFD, this state change is virtually nonexistent. Thus, removal of this "seam" (i.e., time delay) in BFD to create this Seamless BFD (S-BFD) provides a smooth and continuous operational experience for applications.

An S-BFD module on each network node allocates one or more S-BFD discriminators for local entities and creates a reflector BFD session. Allocated S-BFD discriminators may be advertised by applications (e.g., OSPF, IS-IS, etc.). The required result is that applications on other network nodes will know about the S-BFD discriminators allocated by a remote node.

The reflector BFD session, upon receiving an S-BFD control packet targeted to one of the local S-BFD discriminator values, is configured to transmit a response S-BFD control packet back to the initiator. Once this setup is complete, any network node that knows about the S-BFD discriminator allocated by a remote node to a remote entity or entities can quickly perform a continuity test to the remote entity by simply sending S-BFD control packets with a corresponding S-BFD discriminator value in the "Your Discriminator" field.

An S-BFD module (e.g., Node A) in a system (e.g., with IS-IS identifier "xxx") allocates an S-BFD discriminator (e.g., "123"), and IS-IS advertises the S-BFD discriminator 123 in an IS-IS variable with a Type-Length-Value (TLV) format. Another S-BFD module (e.g., Node Z) in the system (e.g., with IS-IS identifier "yyy") allocates an S-BFD Discriminator 456 and IS-IS advertises the S-BFD Discriminator 456 in an IS-IS TLV. A reflector BFD session is created on both network nodes (Nodes A and Z).

When Node A wants to check the reachability of Node Z, Node A can send an S-BFD control packet destined to Node Z with the Your Discriminator field set to 456. When the reflector BFD session on Node Z receives this S-BFD control packet, then a response S-BFD control packet is sent back to Node A, which allows Node A to complete the continuity test.

Network

FIG. 1 is a diagram illustrating an embodiment of a network 10 having a number of nodes (e.g., Nodes A, B, C, D, E, F, G, H, I, J, and Z). The network 10 may be a communications network for enabling communications from one node to another via any suitable path. The network 10 may include any number of nodes, which may be arranged in any number of different administration (admin) domains, intermediate systems, etc. The nodes may be arranged in any suitable configuration having any number of links connecting node pairs in a peer-to-peer relationship, where one node may communicate directly with another node if there is a faultless link therebetween. In some cases, if there is no direct link from one node to another, communication may be routed through one or more intermediate nodes.

Figure 2:
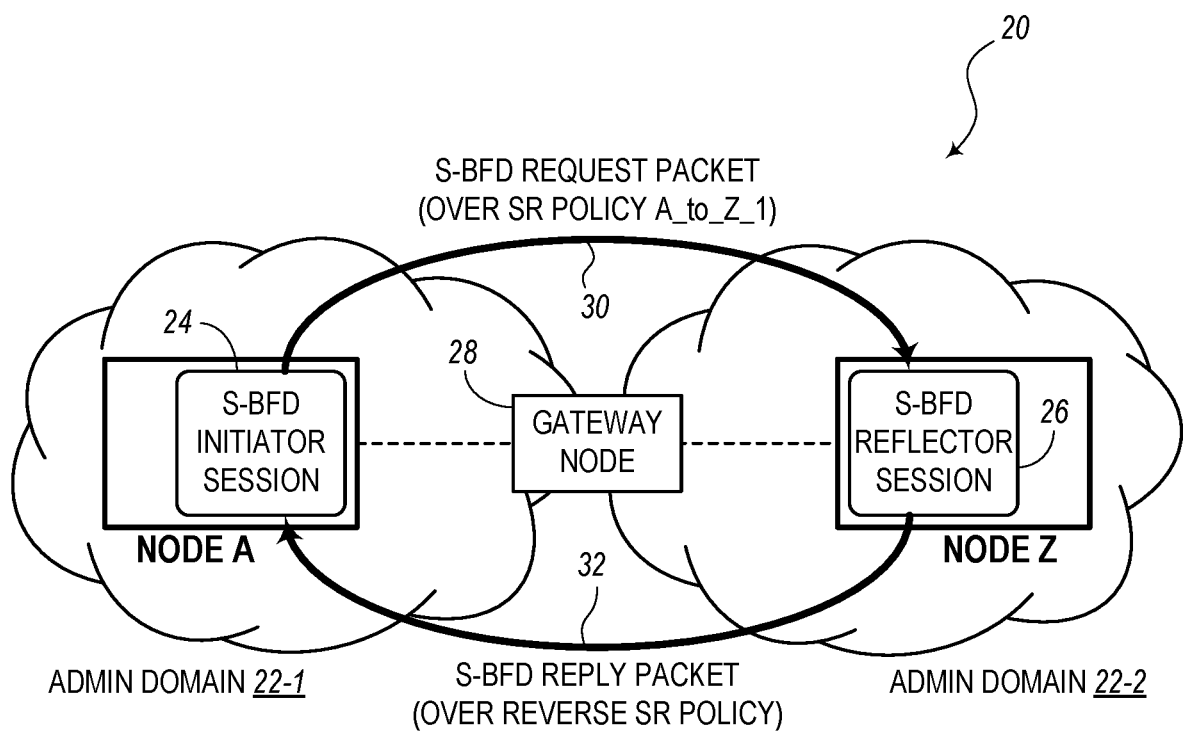
FIG. 2 is a diagram illustrating Bidirectional Forwarding Detection (BFD) communication between two nodes in the network of FIG. 1 for detecting faults in one or more paths between the two nodes, according to various embodiments of the present disclosure.

FIG. 2 is a diagram illustrating a system 20 that enables Bidirectional Forwarding Detection (BFD) communication between two nodes in the network 10. Thus, the system 20 may be viewed as a section of the network 10. In this embodiment, the system 20 shows the communication between Node A and Node Z, where communication includes traversing the network 10 through one or more intermediate nodes along one or more different paths or routes. Again, BFD may be used to detect faults in one or more paths between the two nodes (i.e., Node A and Node Z). The system 20 may be configured to provide an improvement over BFD and/or S-BFD, whereby the system 20 enables an initiator to find or discover a reverse path. Specifically, the discovery of a reverse path by an initiator node does not exist in the known standards.

The system 20 may include multiple nodes operating in a network (e.g., network 10). In this embodiment, Node A is located in a first admin domain 22-1 and Node Z is located in a second admin domain 22-2. Nodes A and Z may be equipped with specific functionality, as described in the present disclosure, to enable the performing of a four-stage procedure. For example, this four-stage procedure may be executed without the help of any centralized controller. According to the illustrated embodiment, Node A is configured as an initiator node and includes an initiator module 24 for performing an S-BFD initiator session. Also, Node Z is configured as a reflector node and includes a reflector module 26 for performing an S-BFD reflector (or responder) session. In other embodiments, the roles of the initiator and reflector may be flip-flopped between the two nodes. Thus, any node having the functionality described in the present disclosure may be configured to act in the role of the initiator and/or the reflector at any time.

The system 20 may be configured to execute this four-stage procedure. The four-stage procedure may involve a step of sending a ping request from an initiator node (e.g., Node A) to a reflector node (e.g., Node Z) and then sending a ping reply from the reflector node back to the initiator node with information useful for determining a reverse path to be used in subsequent stages. The four-stage procedure also involves sending a Bidirectional Forwarding Detection (BFD) request (or S-BFD request) from the initiator node to the reflector node along a first selected path. Then, the reflector node can send a BFD reply back to the initiator node along a reverse path selected by the initiator node. Embodiments of the present disclosure described below may be focused on a perspective with respect to the initiator node, which is responsible for the first and third stages of the four-stage procedure. It should be noted that other embodiments may focus on the perspective of the reflector node, which is responsible for the second and fourth stages of the four-stage procedure, or on any suitable outside perspective within the network 10 in which the two nodes operate.

When the requests are sent along certain paths from Node A to Node Z, the return paths from Node Z back to Node A may be different. In some cases, this can be undesirable. However, the embodiments of the present disclosure may be configured to allow the use of the same or the optimization of path computation to determine a suitable forward path and a suitable reverse path that may be the same as or different from the forward path. The present disclosure provides a way for node A to know the forward and return path SIDs. Basically, Node A send ping messages and get responses. Then, when a BFD request is subsequently transmitted from the initiator node, this request can include a return Binding Segment Identifier (BSID).

The system 20 may include a gateway node 28, which may be configured to provide gateway or edge communication for enabling traffic to flow from one admin domain to another. The initiator module 24 may be configured to send an S-BFD request packet 30 over a Segment Routing (SR) policy (or path), which may be identified as "A_to_Z_1." In response, the reflector module 26 may be configured to provide an S-BFD reply packet 32 over a reverse SR policy. In some respects, the reply packet 32 may be a non-IP packet to provide a solution that has better control over latency in the network 10, since it is known that IP can change dynamically. Therefore, the procedures described herein (e.g., related to the actions of the system 20) are an improvement over conventional systems and methods.

Problem Description

Consider an MPLS SR policy topology as shown in FIG. 2. With Nodes A to Z spanning different admin domains 22-1, 22-2 (or without any common SR-aware SDN controller), it may be desirable:

1) to create a SR policy tunnel from node A to Z, with S-BFD monitoring enabled and S-BFD reply path being labeled.
2) to run MPLS ping request on a SR policy and receive its response over an explicit reverse SR policy path.

Since the initiator (Node A) is unaware of the reverse SR policies, these requirements may not get fulfilled conveniently. One reason is that the default S-BFD return path is IP, which is a non-deterministic path. It may be noted that this requirement might mandate one or more SR policies to be pre-configured in the reverse direction from node Z to A. The conventional mechanisms that exist today to find reverse SR policies on the initiator node are either tedious (e.g., requires explicit knowledge of them) or they need a centralized SR-aware SDN controller (which may not be present, especially if Nodes A and Z communicate across different administrative domains 22-1, 22-2).

Generalized Computing Device

Figure 3:
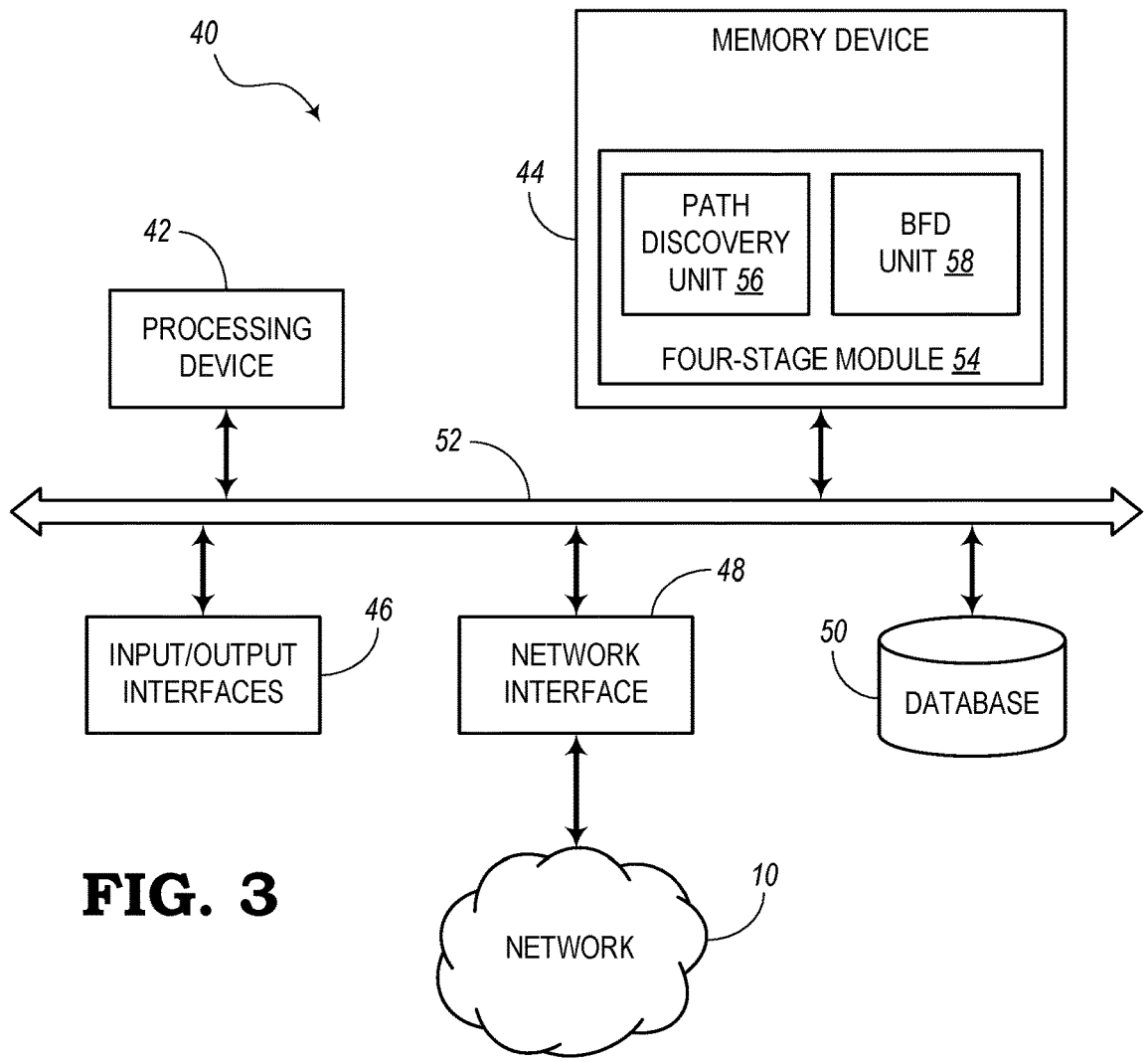
FIG. 3 is a block diagram illustrating either an initiator node or a reflector node in the network of FIG. 1 and which is configured to perform reverse path discovery for the purpose of conducting BFD, according to various embodiments of the present disclosure.

FIG. 3 is a block diagram illustrating an embodiment of a computing device 40. For example, the computing device 40 may be configured as either an initiator node (e.g., Node A) or a reflector node (e.g., Node Z) in a network (e.g., network 10, system 20, etc.). According to various embodiments of the present disclosure, the computing device 40 may be configured to perform a reverse path discovery procedure, which can be conducted for the purpose of further performing fault detection (e.g., BFD) in the network.

In the illustrated embodiment, the computing device 40 may be a digital computing device that generally includes a processing device 42, a memory device 44, Input/Output (I/O) interfaces 46, a network interface 48, and a database 50. It should be appreciated that FIG. 3 depicts the computing device 40 in a simplified manner, where some embodiments may include additional components and suitably configured processing logic to support known or conventional operating features. The components (i.e., 42, 44, 46, 48, 50) may be communicatively coupled via a local interface 52. The local interface 52 may include, for example, one or more buses or other wired or wireless connections. The local interface 52 may also include controllers, buffers, caches, drivers, repeaters, receivers, among other elements, to enable communication. Further, the local interface 52 may include address, control, and/or data connections to enable appropriate communications among the components 42, 44, 46, 48, 50.

It should be appreciated that the processing device 42, according to some embodiments, may include or utilize one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), semiconductor-based devices, chips, and the like). The processing device 42 may also include or utilize stored program instructions (e.g., stored in hardware, software, and/or firmware) for control of the computing device 40 by executing the program instructions to implement some or all of the functions of the systems and methods described herein. Alternatively, some or all functions may be implemented by a state machine that may not necessarily include stored program instructions, may be implemented in one or more Application Specific Integrated Circuits (ASICs), and/or may include functions that can be implemented as custom logic or circuitry. Of course, a combination of the aforementioned approaches may be used. For some of the embodiments described herein, a corresponding device in hardware (and optionally with software, firmware, and combinations thereof) can be referred to as "circuitry" or "logic" that is "configured to" or "adapted to" perform a set of operations, steps, methods, processes, algorithms, functions, techniques, etc., on digital and/or analog signals as described herein with respect to various embodiments.

The memory device 44 may include volatile memory elements (e.g., Random Access Memory (RAM), Dynamic RAM (DRAM), Synchronous DRAM (SDRAM), Static RAM (SRAM), and the like), nonvolatile memory elements (e.g., Read Only Memory (ROM), Programmable ROM (PROM), Erasable PROM (EPROM), Electrically-Erasable PROM (EEPROM), hard drive, tape, Compact Disc ROM (CD-ROM), and the like), or combinations thereof. Moreover, the memory device 44 may incorporate electronic, magnetic, optical, and/or other types of storage media. The memory device 44 may have a distributed architecture, where various components are situated remotely from one another, but can be accessed by the processing device 42.

The memory device 44 may include a data store, database (e.g., database 50), or the like, for storing data. In one example, the data store may be located internal to the computing device 40 and may include, for example, an internal hard drive connected to the local interface 52 in the computing device 40. Additionally, in another embodiment, the data store may be located external to the computing device 40 and may include, for example, an external hard drive connected to the Input/Output (I/O) interfaces 46 (e.g., SCSI or USB connection). In a further embodiment, the data store may be connected to the computing device 40 through a network and may include, for example, a network attached file server.

Software stored in the memory device 44 may include one or more programs, each of which may include an ordered listing of executable instructions for implementing logical functions. The software in the memory device 44 may also include a suitable Operating System (O/S) and one or more computer programs. The O/S essentially controls the execution of other computer programs, and provides scheduling, input/output control, file and data management, memory management, and communication control and related services. The computer programs may be configured to implement the various processes, algorithms, methods, techniques, etc. described herein.

Moreover, some embodiments may include non-transitory computer-readable media having instructions stored thereon for programming or enabling a computer, server, processor (e.g., processing device 42), circuit, appliance, device, etc. to perform functions as described herein. Examples of such non-transitory computer-readable medium may include a hard disk, an optical storage device, a magnetic storage device, a ROM, a PROM, an EPROM, an EEPROM, Flash memory, and the like. When stored in the non-transitory computer-readable medium, software can include instructions executable (e.g., by the processing device 42 or other suitable circuitry or logic). For example, when executed, the instructions may cause or enable the processing device 42 to perform a set of operations, steps, methods, processes, algorithms, functions, techniques, etc. as described herein according to various embodiments.

The methods, sequences, steps, techniques, and/or algorithms described in connection with the embodiments disclosed herein may be embodied directly in hardware, in software/firmware modules executed by a processor (e.g., processing device 42), or any suitable combination thereof. Software/firmware modules may reside in the memory device 44, memory controllers, Double Data Rate (DDR) memory, RAM, flash memory, ROM, PROM, EPROM, EEPROM, registers, hard disks, removable disks, CD-ROMs, or any other suitable storage medium.

Those skilled in the pertinent art will appreciate that various embodiments may be described in terms of logical blocks, modules, circuits, algorithms, steps, and sequences of actions, which may be performed or otherwise controlled with a general purpose processor, a DSP, an ASIC, an FPGA, programmable logic devices, discrete gates, transistor logic, discrete hardware components, elements associated with a computing device, controller, state machine, or any suitable combination thereof designed to perform or otherwise control the functions described herein.

The I/O interfaces 46 may be used to receive user input from and/or for providing system output to one or more devices or components. For example, user input may be received via one or more of a keyboard, a keypad, a touchpad, a mouse, and/or other input receiving devices. System outputs may be provided via a display device, monitor, User Interface (UI), Graphical User Interface (GUI), a printer, and/or other user output devices. I/O interfaces 46 may include, for example, one or more of a serial port, a parallel port, a Small Computer System Interface (SCSI), an Internet SCSI (ISCSI), an Advanced Technology Attachment (ATA), a Serial ATA (SATA), a fiber channel, InfiniBand, a Peripheral Component Interconnect (PCI), a PCI extended interface (PCI-X), a PCI Express interface (PCIe), an InfraRed (IR) interface, a Radio Frequency (RF) interface, and a Universal Serial Bus (USB) interface.

The network interface 48 may be used to enable the computing device 40 to communicate over a network, such as the network 10, the system 20, the Internet, a Wide Area Network (WAN), a Local Area Network (LAN), and the like. The network interface 48 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The network interface 48 may include address, control, and/or data connections to enable appropriate communications on the network 10.

In particular, the computing device 40 may further include a four-stage module 54 configured to perform the four-stage procedure described in the present disclosure. The four-stage module 54 may be implemented in any suitable combination of software/firmware (and stored as non-transitory computer-readable media on the memory device 44) and/or hardware (and embedded in the processing device 42). The four-stage module 54 enables or causes the processing device 42 to perform various functionality with respect to discovering reverse SR policies and performing BFD on a selected reverse SR policy, as described in the present disclosure.

The four-stage module 54 includes a path discovery unit 56 and a BFD unit 58. The path discovery unit 56 allow an initiator node to get (discover) a reverse SR policy from a reflector node. The BFD unit 58, in response to the path discovery unit 56 getting the reverse SR policy, is configured to perform a BFD action via the obtained reverse SR policy. In the four-stage procedure, the path discovery unit 56 is configured to perform stages 1 and 2 and the BFD unit is configured to perform stages 3 and 4. Also, it may be noted that when the computing device 40 is acting as an initiator node, it is configured to perform stages 1 and 3 (using both the path discovery unit 56 and BFD unit 58), whereby if it is acting as a reflector node, it is configured to perform stages 2 and 4 (using both the path discovery unit 56 and BFD unit 58).

Generally, when acting as an initiator node while operating in the network 10, the computing device 40 may store a computer program (e.g., in the memory device 44) having instructions that, when executed, enable the processing device 42 to send an echo request in a forward direction to a reflector node operating in the network. For instance, the network 10 (or system 20) may be arranged without any centralized controller that is able to manage (or control) both the initiator node and the reflector node. The echo request may be sent to the reflector node to discover a reverse path in a reverse direction from the reflector node to the initiator node. Also, the reverse path may be discovered for the purpose of initiating a BFD procedure. According to some embodiments, the echo request, for example, may be a MPLS ping message on a non-policy SR tunnel.

It should be noted that the BFD standard, S-BFD standard, and other related documentation does not enable a reflector to respond to a path discovery request. However, the embodiments of the present disclosure provide ways in which such a response (or reply) is configured. Also, discriminators may point to the Node A, for example, as a source node (or initiator node) and point to Node Z, for example, as a destination node (or reflector node). For simplicity, this nomenclature may be used in the present disclosure for defining the initiator (source) and reflector (destination), but it should be recognized that any node having the four-stage module 54 can act as either the initiator or reflector.

Figure 4:
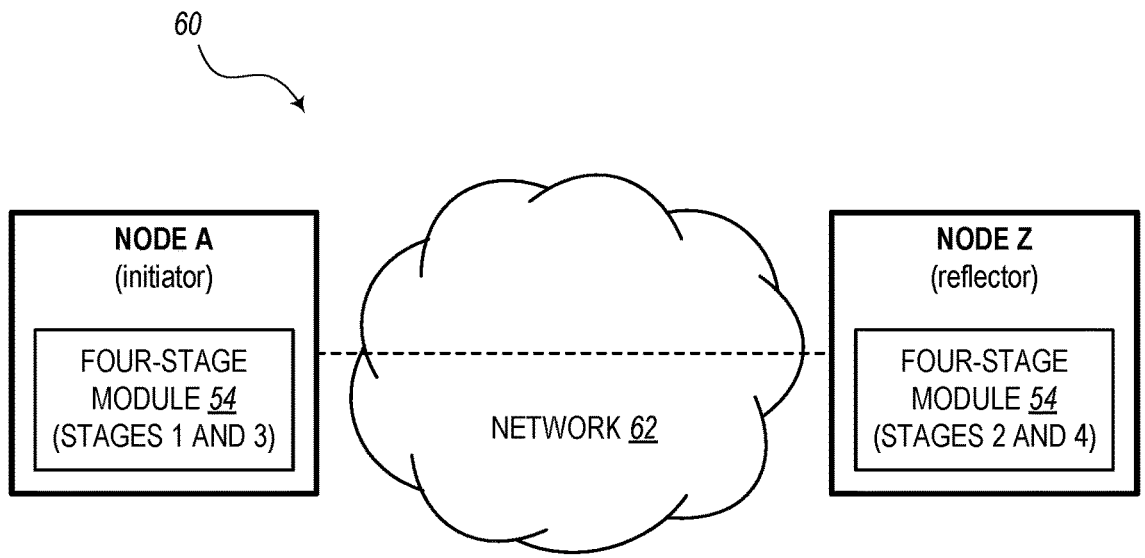
FIG. 4 is a block diagram illustrating both the initiator node and the reflector node for performing a four-stage procedure regarding the reverse path discovery and BFD, according to various embodiments of the present disclosure.

FIG. 4 is a block diagram similar to FIG. 2 that illustrates an embodiment of a section 60 of a network (e.g., network 10). Similar to FIGS. 1 and 2, the section 60 includes Node A and Node Z for showing SR and BFD operations. Both Node A (e.g., the initiator node) and Node Z (e.g., the reflector node) are configured for performing the four-stage procedure described above. For example, each of Nodes A and Z may be configured as the computing device 40 of FIG. 3 and may each include the four-stage module 54 for performing functionality regarding the reverse path discovery (e.g., related to the path discovery unit 56) and the BFD or other fault detection (e.g., related to the BFD unit 58). In some embodiments, the initiator may include just stages 1 and 3 of the four-stage module 54 and the reflector may include just stages 2 and 4 of the four-stage module 54 for enabling the functionality of the present disclosure. The network 62 may include any number of intermediate nodes along any number of paths between Node A and Node B.

Node A may be pre-configured to run SR over IS-IS. This may ensure that a plain non-policy SR tunnel towards Node Z is created. Node Z may be pre-configured with multiple SR policies leading from Node Z itself to Node A (opposite of the SR policies that Node A may be interested in). Also, it may be noted that conventional operation of system, according to SR and BFD protocols, does not include any knowledge at Node A of these "reverse" SR policies (from Node Z to Node A). However, the embodiments of the present disclosure enable such discovery. Then, based on this discovery, BFD and S-BFD may be performed over a selected reverse SR policy.

With this set-up of section 60, a user (e.g., network administrator, network operator, network manager, etc.) associated with Node A may plan to create an SR policy toward Node Z. This SR policy may be defined herein as "A_to_Z_1" and may be a first ("1") SR policy from "A to Z" among multiple SR policies. Then, this SR policy (i.e., A_Z_1) may be used with some type of monitoring or fault detection (e.g., S-BFD). The user may then expect to receive a S-BFD reply (e.g., S-BFD reply packet 32) on a suitable labeled path which meets certain user criteria. For example, the user may enter specific path constraints, which can be communicated to Node Z. Then, Node Z may reply with suitable reverse SR policies that meet these specific path constraints or user-defined criteria.

Four-Stage Procedure

Figure 5A:
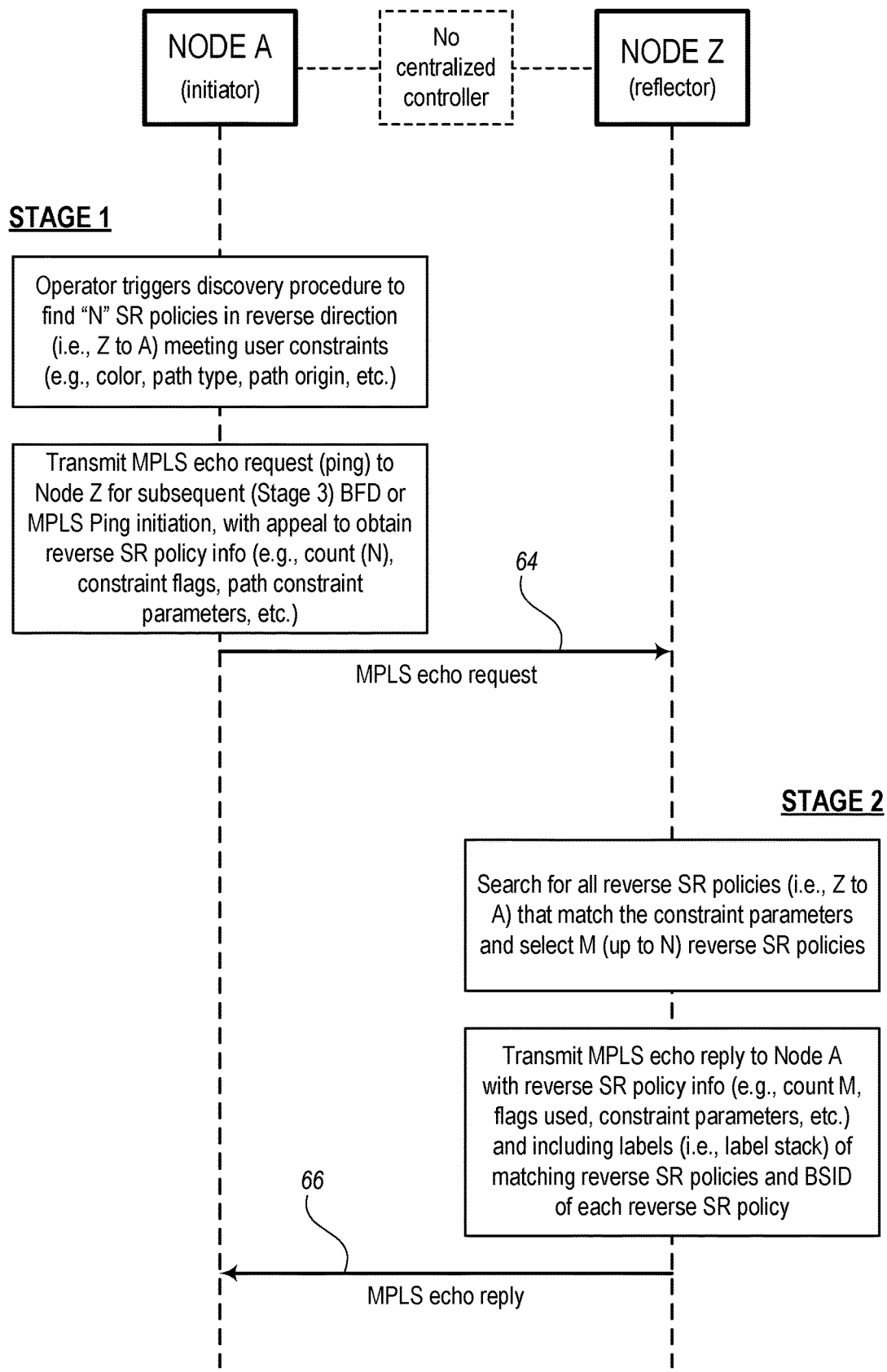
FIGS. 5A and 5B are diagrams illustrating operations of each of the stages of the four-stage procedure, according to various embodiments of the present disclosure.
Figure 5B:
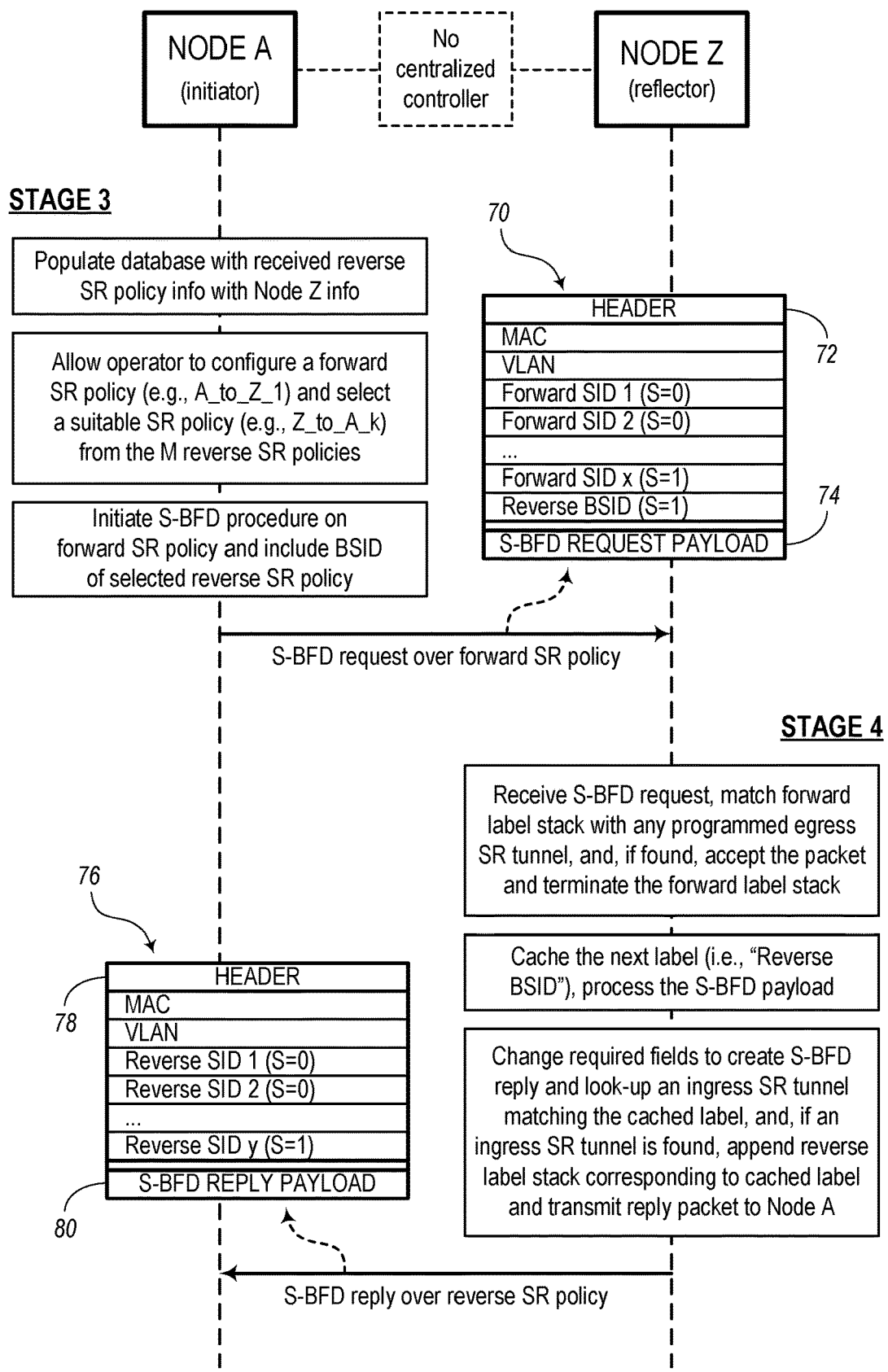

FIGS. 5A and 5B are diagrams illustrating an embodiment of various operations that may be performed at each of the stages of the four-stage procedure (e.g., related to the four-stage module 54). Node A (initiator) is configured to communicate with Node Z (reflector), whereby there is no centralized controller that is used to control or manage both Node A and Node Z. Thus, without centralized control, Nodes A and Z can utilize the four-stage procedure to perform path detection (e.g., BFD or S-BFD).

Stages 1 and 2 of the four-stage procedure are shown in FIG. 5A. Stages 3 and 4 are shown in FIG. 5B. In stage 1, Node A allows the user (operator) to trigger a discovery procedure to find a number "N" of SR policies in the reverse direction (i.e., Z to A) that meet the user constraints. For example, the user constraints may include color, path type, path origin, etc. Then, Node A transmits an MPLS echo request 64 (e.g., ping message) to Node Z. For example, this transmission may be directed along a non-policy SR tunnel between Nodes A and Z. Also, it may be noted that BFD is not performed until stage 3, after the original echo request 64 and reply messages are transmitted.

Also, the MPLS echo request 64 may include an "appeal" to obtain reverse SR policy information. This information appeal may include a request for specific info, such as a count (e.g., N), constraint flags, path constraint parameters, etc. This allows the discovery of up to N reverse SR policies. In some cases, the reverse SR policy information described herein may be referred to as "reverse path info." For example, the reverse path info may include TLV data including:

Count=N
Constraint Flag=<constraint parameters present (requested)>
Path Constraint Parameters=<values of constraint parameters>

In stage 2, Node Z receives the MPLS echo request 64 from Node A and searches for all the reverse SR policies (i.e., from Z to A) that match the constraint parameters. For example, Node Z may find a certain number (M) of reverse SR policies, where 0≤M≤N. Then, Node Z includes transmitting an MPLS echo reply 66 back to Node A with the reverse SR policy information in response to the appeal for the reverse path info. The reverse path info returned to Node A may include:

Count=M
Constraint Flag=<constraint parameters used (met)>
Path Constraint Parameters=<values of constraint parameters>

The MPLS echo reply 66 may also include labels (i.e., a label stack) of the matching reverse SR policies and a BSID for each of the reverse SR policies. For example, this may include TLV data for responding to the appeal for the reverse path info for reverse SR policies that meet the constraints. In some embodiments, the labels may be configured as follows:

Target FEC Stack sub-TLV # 1:
  BSID of SR policy # 1
...
Target FEC Stack sub-TLV # M:
  BSID of SR policy # M where Forwarding Equivalence Class (FEC) is defined in MPLS as a set of packets that a single node or router forwards a) to the same next hop, b) out the same interface, and/or c) with the same treatment (e.g., queueing).

In the MPLS reply message, the total number of reverse SR policy paths existing from Reflector to Initiator may be represented by the count. If the count C is 0 in the MPLS echo reply 66, this may be used to indicate that no policies were found with the required constraints. The user can request any number of policies and prefer to keep reply packets within a certain Maximum Transmission Unit (MTU) size.

Again, stages 1 and 2 are performed beyond what the conventional protocols offer and allows the retrieval of BSID information (for later selection) in preparation for performing a BFD procedure. Normally, the initiator would not have this BSID information or be allowed to request to get it, but the embodiments of the present disclosure overcome these deficiencies of the conventional systems to allow this type of retrieval.

For the MPLS echo request 64 over a given "forward SR policy" from A to Z, the procedure may include receiving the corresponding reply on some reverse SR policy path from Z to A and follow the embodiments described herein. The MPLS echo request 64 over the given forward SR policy would use the selected reverse policy's Forward Equivalence Class (FEC) in its existing "Reply Path" TLV.

Stage 3, shown in FIG. 5B, includes actions at Node A after receiving the MPLS echo reply 66 from Node Z. Node A populate a database (e.g., database 50) with received reverse SR policy information. This includes the Node Z information (i.e., the reverse path info). At this point, a user (operator) is allowed to configure a forward SR policy (e.g., A_to_Z_1) and select a suitable SR policy from the M reverse SR policies as defined in the information from Node Z. For example, the selected reverse SR policy may be "Z_to_A_k," where "k" is one of the M policies.

In some embodiments, there may be multiple reverse SR policies that are considered to be suitable. Thus, the user may use any criteria for selecting one that may be most suitable or sufficiently suitable. For example, the criteria for selection may include choosing the most reliable path, choosing a path based on a first-come, first-serve basis, choosing a lowest cost path, choosing a shortest path, or other various conditions or reasons. Also, according to some embodiments, the user may elect to run more tests (e.g., more MPLS pings) to find further information that can be used for making a proper decision.

Then, Node A includes initiating an S-BFD procedure on a forward SR policy (e.g., A_to_Z_1) and includes the BSID of the selected reverse SR policy for communicating the selection to Node Z. A S-BFD request 70 (or the S-BFD request packet 30 as shown in FIG. 2) is then sent over the forward SR policy. The S-BFD request 70, for example, includes a header 72 and S-BFD request payload 74. The header 72 includes a Media Access Control (MAC) address of Node Z, a Virtual Local Area Network (VLAN) address of Node Z, a label stack related to the forward SR policy, and a reverse BSID. The label stack in this case is configured for communication from Node A to Node Z and includes a number of forward SIDs (e.g., SID 1 to SID x, where x is a number of intermediate segment in the forward SR policy. A value S is used as a flag to represent the end (or bottom) of the stack. When the bottom of the stack is reached (S=1), then no more forwarding is needed and the payload 74 can be processed. The labels may be popped off (removed) at each segment and the packet can be forwarded to the next segment in the list.

The reverse BSID (S=1) defines a return path based on the selected reverse SR policy selected at Node A. This return path is not necessarily the same as the forward path (i.e., A_to_Z_1). The BSID can be used to define a list of labels (in a new label stack) for the return path back to Node A. This return path may be the selected SR policy (e.g., Z_to_A_k). Again, the S flag is used to indicate that the label stack has reached the end of the SIDs and that it is time to process the payload 74. From the mechanism that uses the MPLS echo request 64 over "plain non-policy" SR tunnel from A to Z using the new "reverse path info" TLV, the user may fetch a list of reverse SR policies and select one of them for the needed reply path.

Stage 4 shown in FIG. 5B include the response to receiving the S-BFD request 70 at Node Z. Upon receiving the S-BFD request 70, Node Z includes matching the forward label stack (if not removed by intermediate segments) with any programmed egress SR tunnel. If such a match is found, Node Z accepts the packet and terminates the forward label stack. Node Z can find a suitable output interface or port through which the reply packet can be egressed. Also, Node Z caches the next label (i.e., "Reverse BSID"), which can be used for determining the return path, and can then process the S-BFD payload 74.

Also, stage 4 includes changing the require fields to create a S-BFD reply 76 (or S-BFD reply packet 32 shown in FIG. 2) and looking up an ingress SR tunnel matching the caches label. If an ingress SR tunnel is found, Node Z includes appending a reverse label stack corresponding to the cached label and transmitting the S-BFD reply 76 to Node A. This can be transmitted over the reverse SR policy as defined in the BSID. In this respect, the BSID is expanded out to include all the labels in a stack to include the full list of reverse SIDs.

Node Z transmits the S-BFD reply 76 to Node A. The S-BFD reply 76 includes a header 78 and an S-BFD reply payload 80 for completing the BFD procedure (or other fault detection procedure). In this embodiment, the header 78 of the S-BFD reply 76 includes the MAC and VLAN of Node A and further includes a label stack. The label stack in this case includes the reverse SIDs (e.g., SID 1 through SID y, where y represents the number of intermediate segments from Node Z to Node A in the return path. Again, the flag S represents a bottom of stack. When S is set, the receiving node can determine that it is the intended recipient and is thus configured to process the S-BFD reply payload 80. In this case, the label stack (i.e., Reverse SID 1, Reverse SID 2, . . . , Reverse SID y) is the expanded BSID as expanded out in Node Z in respond to the reception of the Reverse BSID in the header 72 of the S-BFD request packet 70.

The S-BFD request packet 70 transmitted from Node A may include the full label-stack of forward SR policy and BSID of the selected reverse SR policy. When this packet reaches the Reflector node, based on reverse Binding-SID on the label-stack, the reply S-BFD packet would be transmitted back to the Initiator node.

Optionally, the procedure may include an optimization mechanism to prevent delay in subsequently configured forward path SR policies from A to Z and enabling them for data forwarding. This mechanism would be triggered by the receival of S-BFD discriminator via IS-IS from Node Z, and pre-populating the reverse policy database on Initiator. As per RFC-7883, S-BFD discriminator(s) may be advertised in S-BFD discriminator Sub-TLV which may be included in an IS-IS Router Capability TLV. Thus, no extra time would be taken for subsequent forward path SR policy bring-up.

Figure 6A:
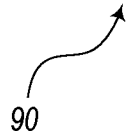
FIG. 6A is a bit map representing an appeal for reverse path information in an echo request packet and a response to the appeal in an echo reply packet, according to various embodiments of the present disclosure.

FIG. 6A is a bit map 90 representing an embodiment of an appeal (e.g., stage 1) for obtaining reverse path information in an echo request packet. This bit map also represent a suitable response to the appeal in an echo reply packet and may be communicated back to the initiator node in the echo reply (e.g., echo reply 66).

The bit map 90 includes the constraint values corresponding to individual bits in the Path Constraint Flags. The order of these values in the echo request 64 is in the order of bits present in Path Constraint Flags, starting from the C flag and moving to next higher bit positions in the packet.

The Path Constraint Color is a constraint that may include the preferred Color of the reverse policy and will be present only if C flag is set to 1 in the Path Constraint Flag. The Path Constraint Path Type is a constraint that may include the preferred Path Type of the reverse policy and will be present if T flag is set to 1 in Path Constraint Flag. Also, the Path Constraint Origin is a constraint that may include the preferred Path Origin of the reverse policy and will be present if O flag is set to 1 in Path Constraint Flag. For example, if the "Path Constraint Flags" have only C and O flags set to 1, then the Constraint Parameters may include "Path Constraint Color" and "Path Constraint Origin," in that order, for instance.

Figure 6B:
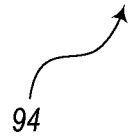
FIG. 6B is a bit map representing the path constraint flags of the bit map of FIG. 6A, according to various embodiments of the present disclosure.

FIG. 6B is a bit map 94 representing the path constraint flags of the bit map 90 shown in FIG. 6A. In this embodiment, the bit map 94 may include flags O (origin), T (type), and C (color) of the path constraints. Also, some bits of the bit map 94 are Must Be Zero (MBZ), "must be set to zero" bits, "Don't Care" bits, or other suitable unused indication. It should be noted that these bit positions may be used for other flags that may be developed for various purposes in the future.

This field in bit map 94 contains a sequence of bits, with each bit representing a flag. Each flag may depict the presence or absence of a specific Constraint Parameter:

Color (C): This flag bit is set to 1 if the Color as a constraint parameter is present.

Path Type (T): This flag bit is set to 1 if the Path Type as a constraint parameter is present.

Path Origin (O): This flag bit is set to 1 if the Path Origin as a constraint parameter is present.

Other flag bits are unassigned and must be set to zero (MBZ). However, they can be extended in future. If Path Constraint Flag is zero and Count is non-zero, then this may imply that the initiator node is requesting reverse policy paths, but it has not set any constraints. In this case, the reflector node can return any policy in the echo reply.

General Process

Figure 7:
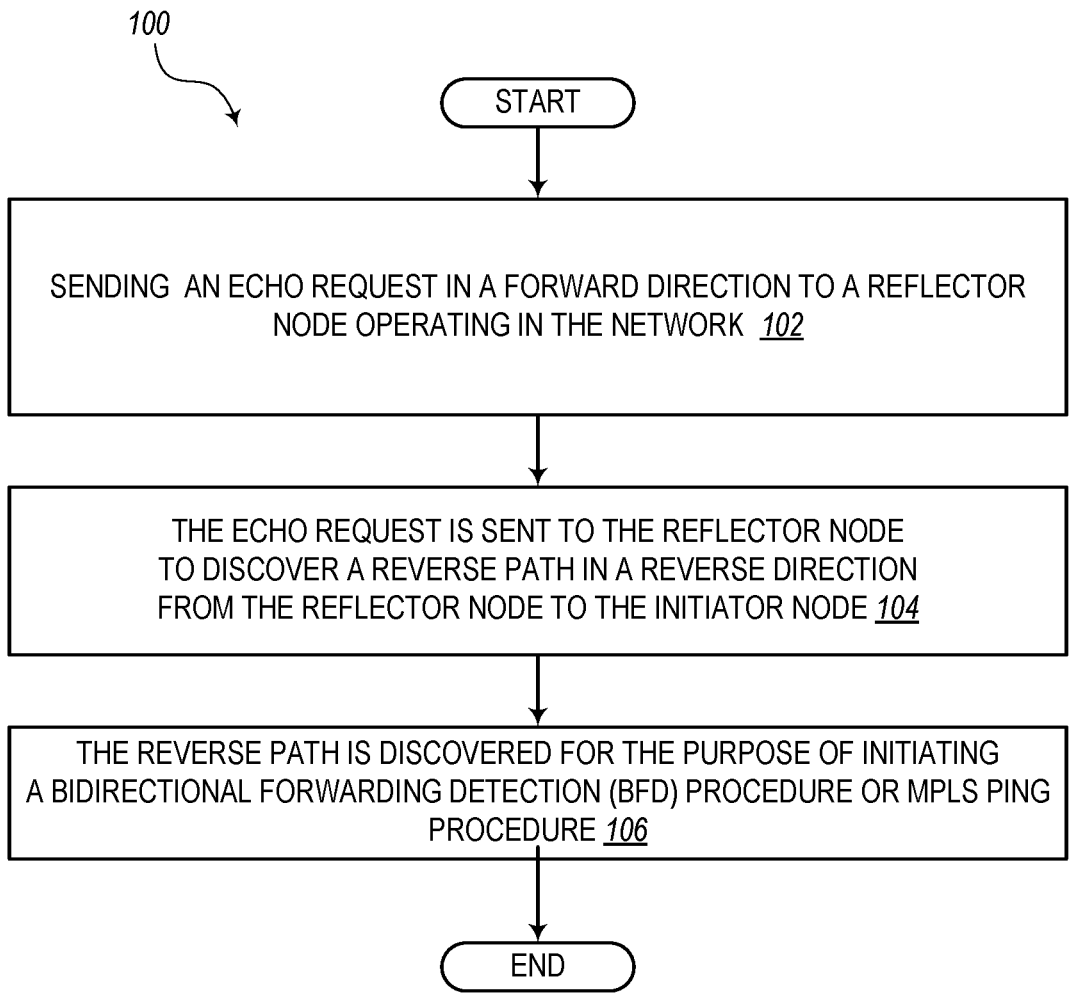
FIG. 7 is a flow diagram illustrating a process for performing a reverse path discovery procedure for initiating BFD, according to various embodiments of the present disclosure.

FIG. 7 is a flow diagram illustrating an embodiment of a process 100 for performing a reverse path discovery procedure for initiating BFD. This process 100 may be associated with (or viewed from the perspective of) Node A (e.g., initiator node). In some embodiments, the process 100 may be executed by the computing device 40 of FIG. 3. In this respect, the process 100 may be part of a computer program (e.g., stored on a non-transitory computer-readable medium) having instructions that enables the processing device 42 to perform certain functions. Also, the process 100 may be associated with the operations of at least the initiator node (Node A) using the four-stage module 54 shown in FIG. 3.

As illustrated, the process 100 includes a step of sending an echo request in a forward direction to a reflector node operating in the network, as indicated in block 102. For instance, the network in this case may not include any centralized or different controller that manages both the initiator node and the reflector node. As indicated in block 104, the echo request may be sent to the reflector node to discover a reverse path in a reverse direction from the reflector node to the initiator node. Also, the process 100 may be defined whereby the reverse path may be discovered for the purpose of initiating a BFD procedure, as indicated in block 106. According to some embodiments, the echo request (e.g., echo request 64), for example, may be a Multi-Protocol Label Switching (MPLS) ping message on a non-policy Segment Routing (SR) tunnel.

Furthermore, the echo request may include an appeal to obtain information about one or more SR policies in the reverse direction. For example, each of the SR policies may include a label stack that defines one or more intermediate nodes in an SR path from the reflector node to the initiator node. Also, this information may include a count (N), constraint flags, and path constraint parameters, where the count N may represent a maximum number of SR policies in the reverse direction to be obtained. Each of the constraint flags may indicate whether a respective path constraint parameter is to be obtained. Each of the path constraint parameters may include color, type, and origin, where color may be a numeric value that distinguishes an SR policy from other SR policies, where type may be a numeric value that represents a path type of each SR policy in the reverse direction, and where origin may be a numeric value that represents an originator of each SR policy in the reverse direction. In some embodiments, the path constraint parameters may be user-defined constraints.

In addition, the process 100 may further include a step of receiving an echo reply from the reflector node in response to the echo request, where the echo reply may include a number (M) of reverse Segment Routing (SR) policies that meet one or more path constraint parameters. Each of the M reverse SR policies may include a label stack and a Binding Segment Identifier (BSID). The process 100 may also include a step of receiving a user selection for selecting one of the reverse SR policies. In some embodiments, the process 100 may include initiating a Seamless BFD (S-BFD) procedure by transmitting an S-BFD request including the BSID of the selected reverse SR policy to the reflector node along a selected forward SR policy. In response to receiving the S-BFD request, the reflector node may be configured to cache the BSID, process a payload of the S-BFD request, and expand the BSID to include a list of one or more reverse Segment Identifiers (SIDs) for transmission of an S-BFD reply to the initiator node along the selected reverse SR policy.

Therefore, it may be noted that S-BFD is a mechanism that may be used to keep checking whether a link or connection is still valid and may be performed as part of a "keep alive" process. S-BFD (RFC 7880) may be seen as an enhancement over BFD and is configured to include a simpler Finite State Machine (FSM). Hence, S-BFD can provide faster session bring-up. This can help in cases pertaining to continuity checks for unidirectional data paths. Some use cases for S-BFD may include determining paths (e.g., LSPs, SR policies, RSVP tunnels, etc.) in a packet or optical network (e.g., network 10).

Ping is a protocol used for detecting data-plane failures over a network path. It defines a probe message, which can be referred to as an "MPLS echo request," and a response message can be referred to as an "MPLS echo reply" for returning the result of the probe. The S-BFD request packets may be in-band on the monitored unidirectional SR policy tunnel and the reply packets can be on an IP return path.

The present embodiments therefore provide many distinctions from the conventional BFD and S-BFD standards. For example, the present embodiments are configured to leverage existing MPLS ping mechanisms over plain non-policy MPLS SR tunnels along with new TLV data to request and fetch details of reverse SR policies. The present systems and methods may include a dynamic mechanism that requires extremely low operational overhead. Also, the present systems and methods only needs a single operator trigger for each destination node, up to where SR policies are planned to be configured.

Thus, the present systems and methods may provide diverse benefits in the field of communications networks. For example, the present embodiments may be configured to solve the problem of finding reverse SR policies for labeled S-BFD reply paths, where an initiator node would normally be unaware of this information in the conventional systems.

Also, the present systems and methods may be applied to topologies where either a centralized controller is absent or SR policy end-points are in the same/different administrative domains and controlled by separate controllers. In addition, the present embodiments provide solutions that may scale well with larger configurations of SR policies with S-BFD monitoring across the entire topology. These benefits can be understood with respect to any vendor that provides equipment that supports S-BFD over SR policy in control plane or data plane and/or chipset manufacturers that provide equipment that supports S-BFD over SR policy in hardware.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A reflector node configured to operate in a network, the reflector node comprising circuitry configured to:
receive a request from an initiator node in the network, the request having been sent in a forward direction from the initiator node to the reflector node to discover a reverse path in a reverse direction from the reflector node to the initiator node, and transmit a reply to the initiator node with one or more reverse Segment Routing (SR) policies that meet one or more path constraint parameters in the request, wherein the initiator node is unaware of reverse SR policies at the reflector node and the one or more path constraint parameters are specified by the initiator node for the reflector node to select the one or more reverse SR policies.

2. The reflector node of claim 1, wherein the reply includes associated Segment Identifiers (SIDs) for the one or more reverse SR policies.

3. The reflector node of claim 1, wherein the reply includes associated Binding Segment Identifiers (BSIDs) for the one or more reverse SR policies.

4. The reflector node of claim 1, wherein the one or more path constraint parameters include any of color, type, and origin, wherein color is a numeric value that distinguishes an SR policy from other SR policies, wherein type is a numeric value that represents a path type of each SR policy in the reverse direction, and wherein origin is a numeric value that represents an originator of each SR policy in the reverse direction.

5. The reflector node of claim 1, wherein the circuitry is further configured to
implement one of Bidirectional Forwarding Detection (BFD) or a Multi-Protocol Label Switching (MPLS) Ping procedure with the initiator node, sent over one of the one or more reverse SR policies.

6. The reflector node of claim 5, wherein the BFD or MPLS Ping procedure include a user selection of one of the one or more reverse SR policies.

7. The reflector node of claim 1, wherein the circuitry is further configured to
receive a Seamless Bidirectional Forwarding Detection (BFD) request with a Binding Segment Identifier (BSID) for one of the one or more reverse SR policies, and
transmit a S-BFD reply to the initiator node a list of one or more reverse Segment Identifiers (SIDs) corresponding to the BSID.

8. The reflector node of claim 1, wherein the circuitry is further configured to
receive a second request from the initiator node with a Binding Segment Identifier (BSID) for one of the one or more reverse SR policies,
cache the BSID, process a payload of the second request, expand the BSID to include a list of one or more reverse Segment Identifiers (SIDs), and
transmit a second reply to the second request using the list.

9. A non-transitory computer-readable medium configured to store computer logic having instructions that, when executed, cause one or more processing devices at a reflector node to:
receive a request from an initiator node in the network, the request having been sent in a forward direction from the initiator node to the reflector node to discover a reverse path in a reverse direction from the reflector node to the initiator node, and
transmit a reply to the initiator node with one or more reverse Segment Routing (SR) policies that meet one or more path constraint parameters in the request, wherein the initiator node is unaware of reverse SR policies at the reflector node and the one or more path constraint parameters are specified by the initiator node for the reflector node to select the one or more reverse SR policies.

10. The non-transitory computer-readable medium of claim 9, wherein the reply includes associated Segment Identifiers (SIDs) for the one or more reverse SR policies.

11. The non-transitory computer-readable medium of claim 9, wherein the reply includes Binding Segment Identifiers (BSIDs) for the one or more reverse SR policies.

12. The non-transitory computer-readable medium of claim 9, wherein the one or more path constraint parameters include any of color, type, and origin, wherein color is a numeric value that distinguishes an SR policy from other SR policies, wherein type is a numeric value that represents a path type of each SR policy in the reverse direction, and wherein origin is a numeric value that represents an originator of each SR policy in the reverse direction.

13. The non-transitory computer-readable medium of claim 9, wherein the instructions that, when executed, further cause the one or more processing devices to
implement one of Bidirectional Forwarding Detection (BFD) or a Multi-Protocol Label Switching (MPLS) Ping procedure with the initiator node, sent over one of the one or more reverse SR policies.

14. The non-transitory computer-readable medium of claim 13, wherein the BFD or MPLS Ping procedure include a user selection of one of the one or more reverse SR policies.

15. The non-transitory computer-readable medium of claim 9, wherein the instructions that, when executed, further cause the one or more processing devices to
receive a Seamless Bidirectional Forwarding Detection (BFD) request with a Binding Segment Identifier (BSID) for one of the one or more reverse SR policies, and
transmit a S-BFD reply to the initiator node using a list of one or more reverse Segment Identifiers (SIDs) corresponding to the BSID.

16. The non-transitory computer-readable medium of claim 9, wherein the instructions that, when executed, further cause the one or more processing devices to
receive a second request from the initiator node with a Binding Segment Identifier (BSID) for one of the one or more reverse SR policies,
cache the BSID, process a payload of the second request, expand the BSID to include a list of one or more reverse Segment Identifiers (SIDs), and
transmit a second reply to the second request using the list.

17. A method implemented at a reflector node comprising steps of:
receiving a request from an initiator node in the network, the request having been sent in a forward direction from the initiator node to the reflector node to discover a reverse path in a reverse direction from the reflector node to the initiator node, and
transmitting a reply to the initiator node with one or more reverse Segment Routing (SR) policies that meet one or more path constraint parameters in the request, wherein the initiator node is unaware of reverse SR policies at the reflector node and the one or more path constraint parameters are specified by the initiator node for the reflector node to select the one or more reverse SR policies.

18. The method of claim 17, wherein the reply includes associated Segment Identifiers (SIDs) for the one or more reverse SR policies.

19. The method of claim 17, wherein the steps further include
- implementing one of Bidirectional Forwarding Detection (BFD) or a Multi-Protocol Label Switching (MPLS) Ping procedure with the initiator node, sent over one of the one or more reverse SR policies.

20. The method of claim 17, wherein the steps further include
- receiving a Seamless Bidirectional Forwarding Detection (BFD) request with a Binding Segment Identifier (BSID) for one of the one or more reverse SR policies, and
- transmitting a S-BFD reply to the initiator node using a list of one or more reverse Segment Identifiers (SIDs) corresponding to the BSID.

* * * * *